US008669946B2

(12) United States Patent
Tong

(10) Patent No.: US 8,669,946 B2
(45) Date of Patent: Mar. 11, 2014

(54) ELECTRONIC DEVICE INCLUDING TOUCH-SENSITIVE DISPLAY AND METHOD OF CONTROLLING SAME

(75) Inventor: Kuo-Feng Tong, Etobicoke (CA)

(73) Assignee: BlackBerry Limited, Waterloo (CA)

( * ) Notice: Subject to any disclaimer, the term of this patent is extended or adjusted under 35 U.S.C. 154(b) by 565 days.

(21) Appl. No.: 12/790,015

(22) Filed: May 28, 2010

(65) Prior Publication Data

US 2011/0291951 A1  Dec. 1, 2011

(51) Int. Cl.
*G06F 3/041* (2006.01)

(52) U.S. Cl.
USPC .......................................... 345/173; 345/175

(58) Field of Classification Search
USPC .................................................. 345/156–175
See application file for complete search history.

(56) References Cited

U.S. PATENT DOCUMENTS

| | | | |
|---|---|---|---|
| 4,918,262 A * | 4/1990 | Flowers et al. | 345/173 |
| 2006/0197753 A1 | 9/2006 | Hotelling | |
| 2006/0279548 A1* | 12/2006 | Geaghan | 345/173 |
| 2009/0243817 A1 | 10/2009 | Son | |
| 2010/0007613 A1* | 1/2010 | Costa | 345/173 |
| 2010/0013777 A1* | 1/2010 | Baudisch et al. | 345/173 |
| 2010/0053116 A1* | 3/2010 | Daverman et al. | 345/175 |
| 2011/0043462 A1* | 2/2011 | Shabra et al. | 345/173 |

FOREIGN PATENT DOCUMENTS

| | | |
|---|---|---|
| CA | 2316067 A1 | 2/2002 |
| EP | 2241955 A1 | 10/2010 |

OTHER PUBLICATIONS

Extended European Search Report dated Nov. 29, 2010, issued from the corresponding European patent application.

* cited by examiner

*Primary Examiner* — Kevin M Nguyen
*Assistant Examiner* — Kenneth B Lee, Jr.
(74) *Attorney, Agent, or Firm* — Steven M. Greenberg, Esq.; CRGO Law

(57) ABSTRACT

A method includes detecting a first touch at a first location and a second touch at a second location on a touch-sensitive display, determining a first force value by a first sensor and a second force value by a second sensor, wherein the first force value and the second force value are determined at a time when the first touch and the second touch are both detected, and determining a first applied force value for the first touch and a second applied force value for the second touch based on the first force value and the second force value and based on the first location and the second location.

15 Claims, 5 Drawing Sheets

ELECTRONIC DEVICE INCLUDING TOUCH-SENSITIVE DISPLAY AND METHOD OF CONTROLLING SAME

FIELD OF TECHNOLOGY

The present disclosure relates to electronic devices including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed.

Improvements in devices with touch-sensitive displays are desirable.

DETAILED DESCRIPTION

Figure 1:
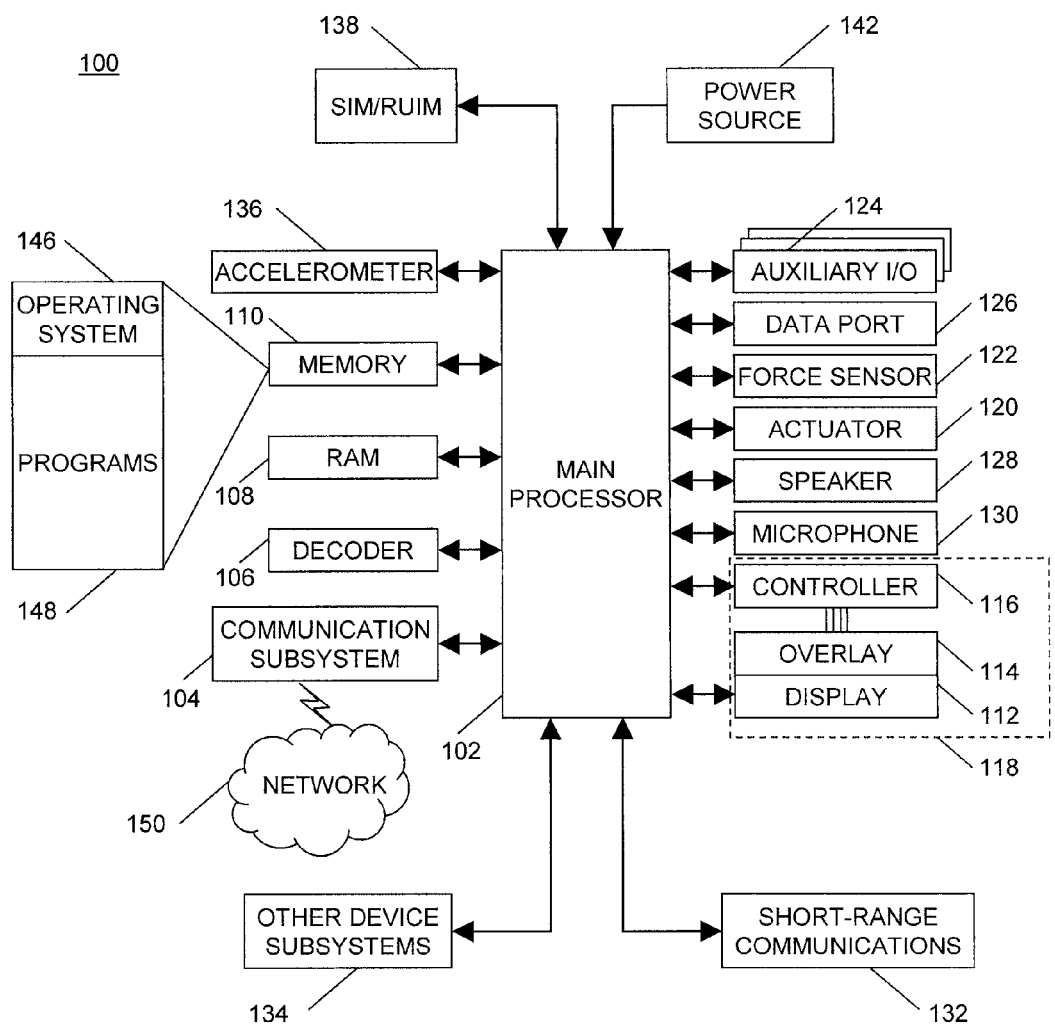
FIG. 1 is a block diagram of a portable electronic device in accordance with the present disclosure.

The following describes an electronic device and method of controlling the electronic device. The method includes detecting a first touch at a first location and a second touch at a second location on a touch-sensitive display, determining a first force value by a first sensor and a second force value by a second sensor, wherein the first force value and the second force value are determined at a time when the first touch and the second touch are both detected, and determining a first applied force value for the first touch and a second applied force value for the second touch based on the first force value and the second force value and based on the first location and the second location.

For simplicity and clarity of illustration, reference numerals may be repeated among the figures to indicate corresponding or analogous elements. Numerous specific details are set forth to provide a thorough understanding of the embodiments described herein. The embodiments may be practiced without these specific details. In other instances, well-known methods, procedures, and components have not been described in detail so as not to obscure the embodiments described herein. The description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

The processor 102 interacts with other devices, such as a Random Access Memory (RAM) 108, memory 110, a display 112 with a touch-sensitive overlay 114 operably coupled to an electronic controller 116 that together comprise a touch-sensitive display 118, one or more actuators 120, a plurality of force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118 and processed by the controller 116, for example, to determine a location of a touch. Touch location data may include a single point of contact, such as a point at or near a center of the area of contact, or the entire area of contact for further processing. The location of a touch detected on the touch-sensitive display 118 may include x and y components, e.g., horizontal and vertical with respect to one's view of the touch-sensitive display 118, respectively. For example, the x component may be determined by a signal generated from one touch sensor layer, and the y component may be determined by a signal generated from another touch sensor layer. A signal is provided to the controller 116 in response to detection of a suitable object, such as a finger, thumb, or other items, for example, a stylus, pen, or other pointer, depending on the nature of the touch-sensitive display 118. More than one simultaneous location of contact may occur and be detected.

Figure 2:
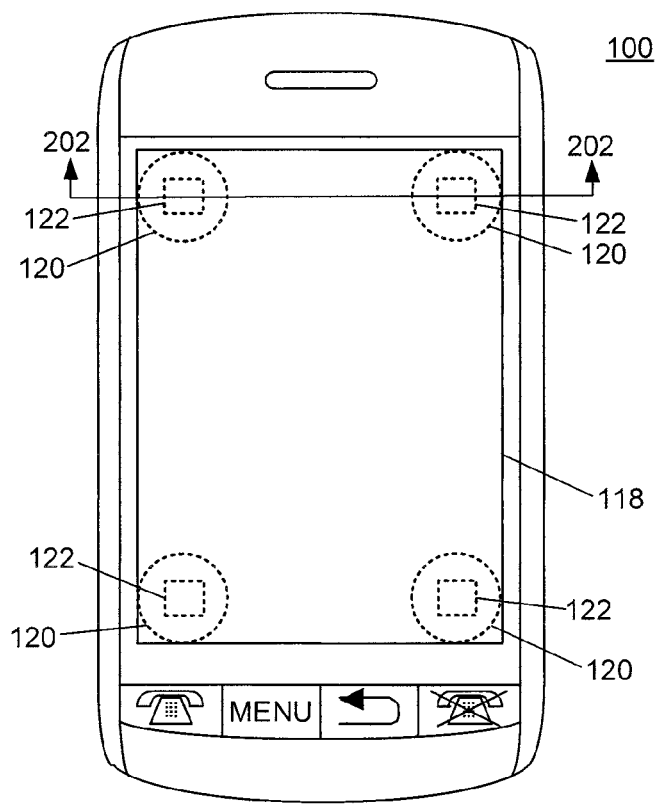
FIG. 2 is a front view of an example of a portable electronic device in accordance with the present disclosure.
Figure 3:
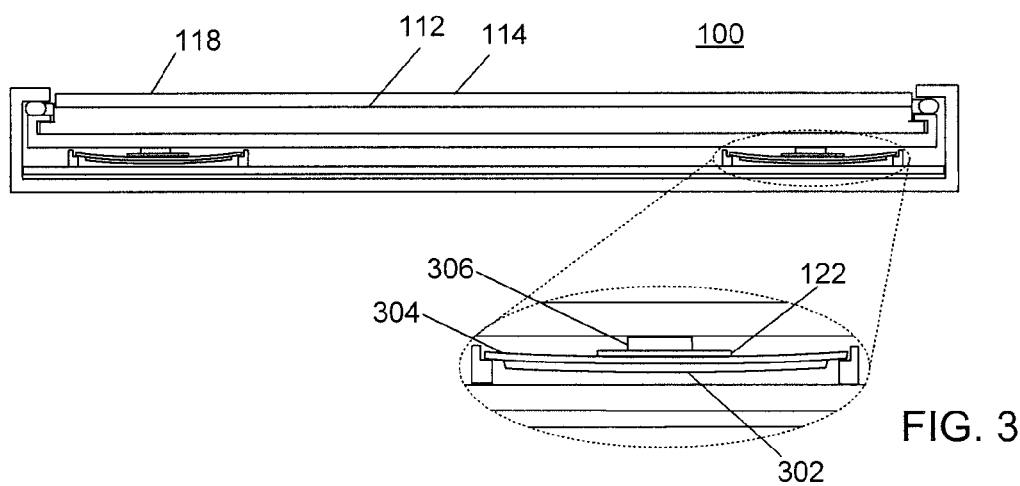
FIG. 3 is a sectional view through line 202 of FIG. 2 in accordance with the present disclosure.

The actuator 120 may comprise one or more piezoelectric (piezo) actuators that provide tactile feedback. A front view of an example of a portable electronic device 100 is shown in FIG. 2. The actuator 120 comprises four piezo actuators 120, each located near a respective corner of the touch-sensitive display 118. FIG. 3 is a sectional side view of the portable electronic device 100 through the line 202 of FIG. 2. Each piezo actuator 120 is supported within the portable electronic device 100 such that contraction of the piezo actuators 120 imparts a force on the touch-sensitive display 118, opposing a force externally imparted on the display 118. Each piezo actuator 120 includes a piezoelectric device 302, such as a piezoelectric disk, adhered to a substrate 304, such as a metal substrate. An element 306 that is advantageously at least partially flexible and comprises, for example, hard rubber may be located between the piezo device 302 and the touch-sensitive display 118. The element 306 does not substantially dampen the force imparted on the touch-sensitive display 118. In the example of FIG. 2, four force sensors 122 are utilized, with each force sensor 122 located between an element 306 and the substrate 304. The substrate 304 bends when the piezo device 302 contracts diametrically due to build up of charge/voltage at the piezo device 302 or in response to an external force imparted on the touch-sensitive display 118. The charge/voltage may be adjusted by varying the applied voltage or current, thereby controlling the force imparted by the piezo actuators 120 on the touch-sensitive display 118. The charge/voltage on the piezo actuators 120 may be removed by a controlled discharge voltage/current that causes the piezo device 302 to expand diametrically, decreasing the force imparted by the piezo actuators 120 on the touch-sensitive display 118. Absent an external force imparted on the overlay 114 and absent a charge/voltage on the piezodevice 302, the piezo actuator 120 may be slightly bent due to a mechanical preload.

Figure 4:
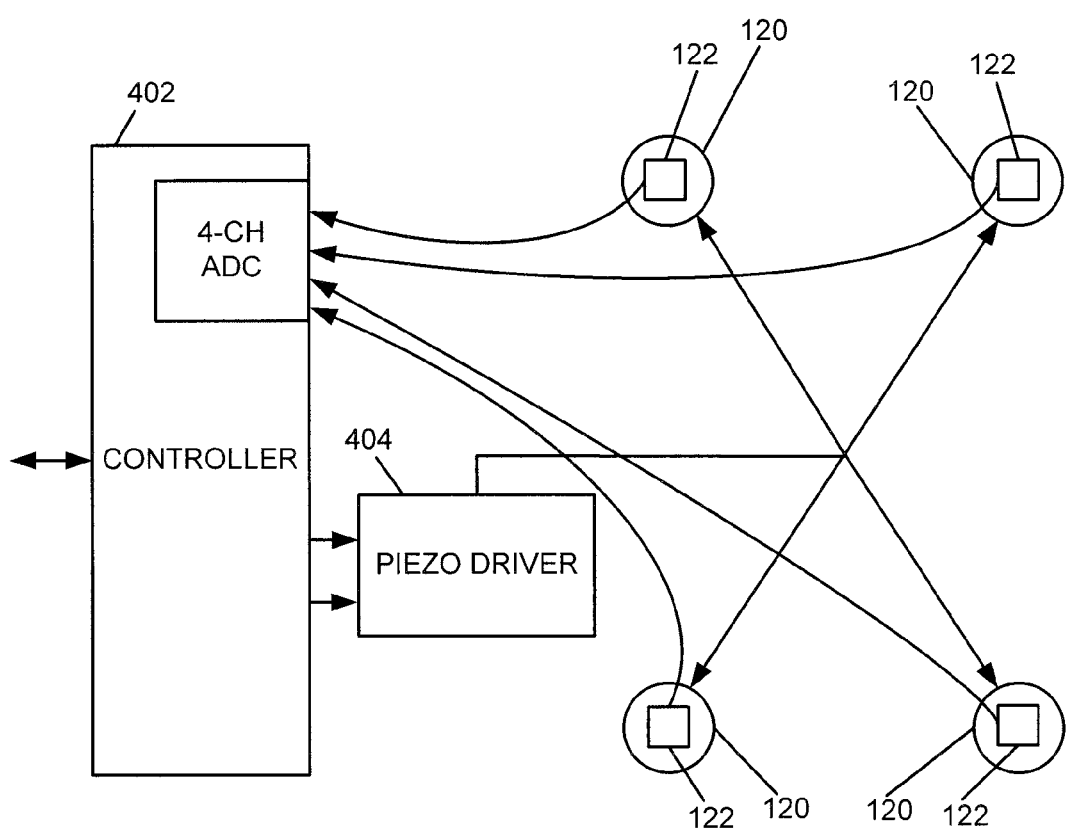
FIG. 4 is a functional block diagram showing components of the portable electronic device in accordance with the present disclosure.

FIG. 4 shows a functional block diagram of components of the portable electronic device 100. In this example, each force sensor 122 is coupled to a controller 402, which includes an amplifier and analog-to-digital converter (ADC). The force sensors 122 may be, for example, force-sensing resistors in an electrical circuit wherein the resistance changes with force imparted on the force sensors 122. As force imparted on the touch-sensitive display 118 increases, the resistance decreases. This change is determined via the controller 402 for each of the force sensors 122. Each force sensor 122 is calibrated to determine a force value, referred to herein as the measured force. The measured forces by the four force sensors 122 may differ depending on the location of the force imparted on the touch-sensitive display 118. For example, a force imparted by a touch at an off-center location on the touch-sensitive display 118 results in a higher measured force at the force sensor 122 nearest the touch location than the measured forces at the force sensors 122 that are farther away from the touch location.

The piezo actuators 120 are coupled to a piezo driver 404 that communicates with the controller 402. The controller 402 is also in communication with the main processor 102 of the portable electronic device 100 and may receive and provide signals to the main processor 102. The piezo driver 404 may optionally be embodied in drive circuitry between the controller 402 and the actuators 120. The controller 402 controls the piezo driver 404 that controls the voltage/current to the piezoelectric devices 302 and thus controls the charge/voltage and the force imparted by the piezo actuators 120 on the touch-sensitive display 118. Each of the piezoelectric devices 302 may be controlled substantially equally and concurrently. Optionally, the piezoelectric devices 302 may be controlled separately. Collapse and release of a dome switch may be simulated. Other switches, actuators, keys, and so forth may be simulated, or a non-simulated tactile feedback may be provided.

The mechanical work performed by the piezo actuators 120 may be controlled to provide generally consistent force and movement of the touch-sensitive display 118 in response to detection of a touch on the touch-sensitive display 118. Fluctuations in mechanical work performed, for example, as a result of temperature variation, may be reduced by adjusting the voltage/current to control the charge/voltage.

Figure 5:
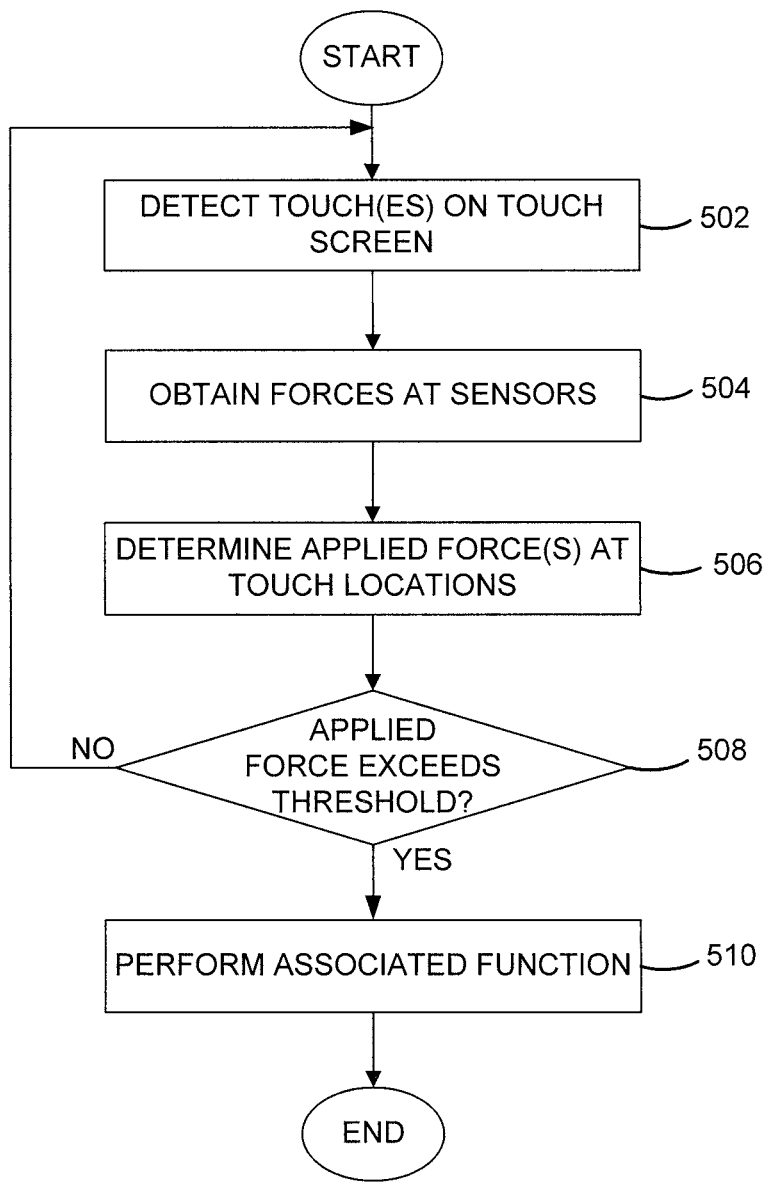
FIG. 5 is a flowchart illustrating a method of controlling a portable electronic device in accordance with the present disclosure.

A flowchart illustrating a method of controlling a portable electronic device is shown in FIG. 5. The method may be carried out by computer-readable code executed, for example, by the processor 102. Computer-readable code executable by at least one processor of the portable electronic device to perform the method may be stored in a computer-readable medium. Coding of software for carrying out such a method is within the scope of a person of ordinary skill in the art given the present description. The method may contain additional or fewer processes than shown and/or described, and may be performed in a different order.

Two touches on the touch-sensitive overlay 114 of the touch-sensitive display 118 are detected 502 and the locations of the touches are determined. Force values at the force sensors 122 are determined 504. An applied force value at each touch location is determined 506. An applied force value is a value related to the force imparted at a location on the touch-sensitive display 118. When the applied force value for each touch does not meet a threshold force, as determined at 508, the process continues at 502. An applied force value meets a threshold force when the applied force value is at or beyond the threshold force. When the applied force value for either of the touches meets the threshold force, as determined at 508, an associated function is performed 510. For example, the charge/voltage at the piezo actuators 120 may be modified to impart a force to simulate collapse of a dome switch. A selection of a feature may be made when the location of the touch, for which the applied force value exceeds the threshold force, is associated with a selectable feature on the touch-sensitive display 118. The flowchart of FIG. 5 is simplified for the purpose of explanation. The process may be repeated as further touches are detected.

Figure 6:
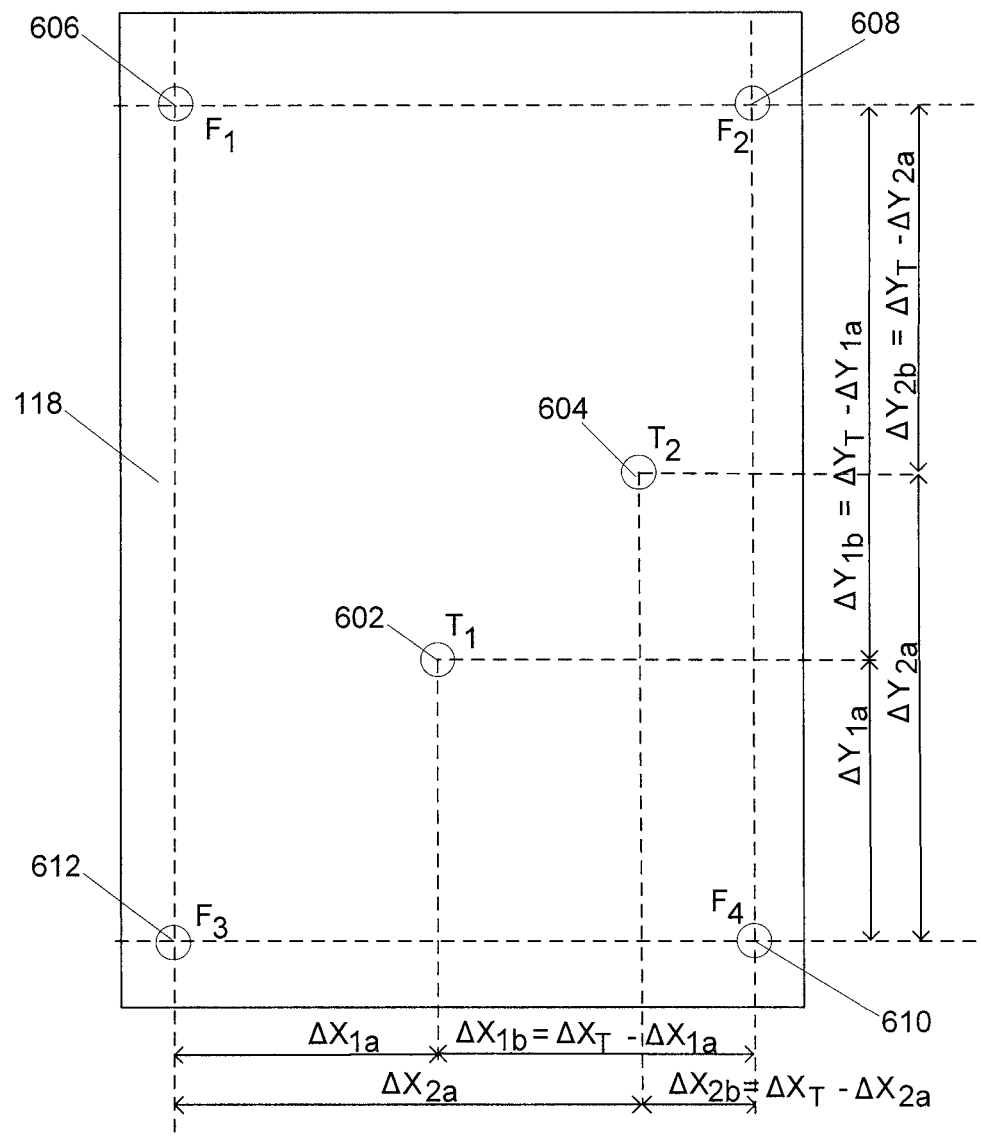
FIG. 6 illustrates touch locations on a touch-sensitive display in accordance with the present disclosure.

An example of the method of controlling a portable electronic device in accordance with the present embodiment is described with reference to FIG. 6, which illustrates touch locations on a touch-sensitive display 118. In the on or awake state of the portable electronic device 100, selectable features are displayed on the touch-sensitive display 118. Such selectable features may include, for example, icons for selection of an application for execution by the processor 102, buttons for selection of options, keys of a virtual keyboard, keypad or any other suitable features. Two touches are detected at a first location 602 and a second location 604 on the touch-sensitive display 118. When a force is imparted on the touch-sensitive display 118, four force values are determined from signals from each of the force sensors 122.

The applied force value of each touch is determined by the processor 102 based on the force values determined utilizing each of the force sensors 122 and based on the touch locations for the first and second touches. The applied force value for each touch is determined, in this example, from a force balance equation, referred to as "force balance," based on the force values at the force sensors and based on a torque balance equation, referred to as "torque balance," utilizing the force values at the force sensors 122 and distances along at least one coordinate axis of each of the first and second touches from the force sensors 122. In the example illustrated in FIG. 6, a $F_{T1}$ is a force value related to force imparted by the first touch at the first location 602, and a $F_{T2}$ is a force value related to force imparted by a the second touch at the second location 604 on the touch-sensitive display 118. The four force values $F_1, F_2, F_3, F_4$ are determined at the four locations 606, 608, 610, 612 of the force sensors 122. Because $F_1, F_2, F_3, F_4$ are measured, these forces are related to the first and second forces imparted on the touch-sensitive display 118, and thus the first and second applied force values, e.g., by the force balance:

$$F_{T1}+F_{T2}=F_1+F_2+F_3+F_4$$

When a single touch is detected, the measured force values are attributed to the single touch such that $F_{T1}=F_1+F_2+F_3+F_4$.

When two touches $T_1$ and $T_2$ are detected, the applied force values $F_{T1}$ and $F_{T2}$ at the touches may be resolved. The coordinate distances, (x-coordinate distances and y-coordinate distances, from the first location 602 to the locations 606, 608, 610, 612 of the force sensors may be determined based on the location of each touch. The coordinate distances and force values are related by the torque balance:

$$F_{T1}\times\Delta X_{1A}+F_{T2}\times\Delta X_{2A}-(F_2+F_4)\times\Delta X_T=0$$

where $\Delta X_{1A}$ is an x coordinate distance from the first location 602 to the location of the measured force value $F_1$;

$\Delta X_{2A}$ is an x coordinate distance from the second location 604 to the location of the measured force value $F_1$; and $\Delta X_T$ is the total x coordinate distance between the measured force value $F_1$ and the measured force value $F_2$.

With the force and torque balance, the applied force value $F_{T1}$ at the first location 602 and the applied force value $F_{T2}$ at the second location 604 may be resolved because the distances $\Delta X_{1A}, \Delta X_{2A}, \Delta X_T$ are determined and the forces at the force sensors, the measured force values $F_1, F_2, F_3, F_4$, are determined.

A determination is made whether or not one or both of the applied force values meet a minimum threshold force. Thus, the applied force values $F_{T1}$ at the first location 602 and $F_{T2}$ at the second location 604 are compared to a threshold force. When the applied force value at either of the touch locations meets the threshold force, a function or functions are performed. For example, when the applied force value at the first location 602 meets the threshold force, the charge at the piezo actuators 120 may be modified to simulate collapse of a dome switch to provide the user with tactile feedback. A selectable feature at a location on the touch-sensitive display 118 that corresponds to the location of the first touch 602 is selected.

In the above example, the two touches have different X coordinate distances from each touch location 602, 604 to the location of the measured force $F_1$. When, the X coordinate distances are equal where $\Delta X_{1A}=\Delta X_{2A}$, for example, the force balance and torque balance may be carried for the Y-axis as:

$$F_{T1}\times\Delta Y_{1A}+F_{T2}\times\Delta Y_{2A}-(F_3+F_4)\times\Delta Y_T=0$$

where $\Delta Y_{1A}$ is an Y coordinate distance from the first location 602 to the location of the measured force value $F_1$;

$\Delta Y_{2A}$ is an Y coordinate distance from the first location 602 to the location of the measured force value $F_1$; and $\Delta Y_T$ is the total Y coordinate distance between the measured force value $F_1$ and the measured force value $F_3$.

In another example, the applied force value $F_{T1}$ at the first location 602 and the applied force value $F_{T2}$ at the second location 604 are both determined by a force and torque balance based on the x-coordinate distances. The applied force value $F_{T1}$ at the first location 602 and the applied force value $F_{T2}$ at the second location 604 are also determined by a force and torque balance based on the y-coordinate distances. Multiple determinations of applied force values $F_{T1}$ and $F_{T2}$ may be utilized for increased reliability of the determined applied force values, for example, when the x-coordinate distances are close.

In another example, the applied force values may be compared to determine the touch at which a greater force is imparted. A determination may be made whether or not the greater of the two determined applied force values meets a minimum threshold force. The charge at the piezo actuators 120 may be modified to simulate collapse of a dome switch to provide the user with a positive tactile feedback when the applied force value at a touch meets the minimum threshold. A selectable feature at a location on the touch-sensitive display 118 that corresponds to the location at which the greater force is imparted may be selected.

The measured force values $F_1, F_2, F_3, F_4$ at the force sensors in the above examples are utilized to determine the applied force values related to detected touch on the touch-sensitive display 118. In another example, the force values at the force sensors may be adjusted depending on the orientation of the portable electronic device 20. Thus, depending on the orientation, as determined based on signals from the accelerometer 136, the force values $F_1$, $F_2$, $F_3$, $F_4$ may be adjusted to compensate for the mass of the touch-sensitive display 118 and the force of gravity.

The electronic device includes force sensors and a touch-sensitive display. Touches on the touch-sensitive display are detected and the location of each of the touches on the touch-sensitive display is determined. Force sensors are used to determine force values related to the forces near, for example, the force sensor of the touch-sensitive display when a touch is detected on the touch-sensitive display. The force values and the location of the touches may be utilized to determine the respective applied force value at each of two touch locations on the touch-sensitive display. The determination of respective applied force values may be utilized to distinguish, for example, an inadvertent touch from a selection of a feature on the display or other input. An input to the portable electronic device may be determined based on the applied force values and tactile feedback may be provided when a threshold force is met. When multiple simultaneous touches are detected, the method provides a identification of one of the touches to determine which selection is input.

A method includes detecting a first touch at a first location and a second touch at a second location on a touch-sensitive display, determining a first force value by a first sensor and a second force value by a second sensor, wherein the first force value and the second force value are determined at a time when the first touch and the second touch are both detected, and determining a first applied force value for the first touch and a second applied force value for the second touch based on the first force value and the second force value and based on the first location and the second location.

A portable electronic device includes, a touch-sensitive display, a plurality of force sensors, and a processor coupled to the force sensors and to the touch-sensitive display to detect a first touch and a second touch, determine a first force value utilizing the first force sensor and a second force value utilizing the second force sensor, wherein the first force value and the second force value are determined at a time when the first touch and the second touch are both detected, and to determine a first applied force value for the first touch and a second applied force value for the second touch based on the first force value and the second force value and based on the first location and the second location.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   detecting a first touch at a first location and a second touch at a second location on a touch-sensitive display of an electronic device;
   determining a first force value on the touch-sensitive display utilizing a first sensor of the electronic device and a second force value on the touch-sensitive display utilizing a second sensor of the electronic device, the first force value and the second force value being determined at a time when the first touch and the second touch are both detected;
   determining a first applied force value for the first touch and a second applied force value for the second touch by utilizing a force balance technique utilizing the first force value and the second force value, and by utilizing a torque balance technique utilizing the first force value, the second force value, and distances, along respective coordinate axes of each of the first touch and the second touch from the first sensor and the second sensor.

2. The method according to claim 1, comprising determining a third force value on the touch-sensitive display utilizing a third sensor of the electronic device and a fourth force value on the touch-sensitive display utilizing a fourth sensor of the electronic device, wherein the third force value and the fourth force value are determined at the time when the first touch and the second touch are both detected.

3. The method according to claim 2, wherein determining the first applied force value and the second applied force value comprises determining utilizing the force balance technique further utilizing the third force value, and the fourth force value, and utilizing the torque balance technique further utilizing the third force value, and the fourth force value.

4. The method according to claim 1, comprising determining an orientation of the electronic device, wherein determining the first force value and the second force value comprises compensating for the orientation of the electronic device based on gravity and a mass of the touch-sensitive display.

5. The method according to claim 1, comprising determining whether a greater applied force value is associated with the first location or the second location.

6. The method according to claim 1, comprising determining an input based on the first applied force value and the second applied force value.

7. The method according to claim 1, comprising performing an associated function when the greater of the first applied force value and the second applied force value meets a threshold force value.

8. A computer-readable storage device having computer-readable code executable by at least one processor of the portable electronic device to perform the method of claim 1.

9. An electronic device comprising:
   a touch-sensitive display;
   a first force sensor and a second force sensor;
   a processor coupled to the first force sensor, the second force sensor, and the touch-sensitive display to:
      detect a first touch and a second touch;
      determine a first force value on the touch-sensitive display utilizing the first force sensor and a second force value on the touch-sensitive display utilizing the second force sensor, the first force value and the second force value being determined at a time when the first touch and the second touch are both detected;
      determine a first applied force value for the first touch and a second applied force value for the second touch based on by utilizing a force balance technique utilizing the first force value and the second force value and based on by utilizing a torque balance technique utilizing the first force value, the second force value, and distances, along respective coordinate axes, of each of the first touch and the second touch from the first sensor and the second sensor.

10. The electronic device according to claim 9, comprising a third force sensor and a fourth force sensor, each coupled to the processor to determine a third force value on the touch-sensitive display utilizing the third force sensor of the electronic device and a fourth force value on the touch-sensitive display utilizing the fourth force sensor of the electronic device at the time when the first touch and the second touch are both detected.

11. The electronic device according to claim 10, wherein the processor determines the first applied force value and the second applied force value further utilizing the force balance technique further utilizing the third force value, and the fourth force value, and utilizing the torque balance technique further utilizing the third force value and the fourth force value.

12. The electronic device according to claim 9, comprising an accelerometer arranged and constructed to determine an orientation of the electronic device, wherein the processor adjusts the first force value and the second force value to compensate for the force of gravity and a mass of the touch-sensitive display, based on the orientation of the electronic device.

13. The electronic device according to claim 9, comprising a third force sensor and a fourth force sensor, each coupled to the processor to determine a third force value on the touch-sensitive display utilizing the third force sensor a fourth force value on the touch-sensitive display utilizing the fourth force sensor, wherein each of the first force sensor, the second force sensor, the third force sensor, and the fourth force sensor is positioned near a respective corner of the touch-sensitive display.

14. The electronic device according to claim 9, comprising a plurality of piezo actuators arranged and constructed to apply a force to the touch-sensitive display in response to determining that at least one of the first applied force value and the second applied force value exceeds a threshold force.

15. The electronic device according to claim 14, wherein each force sensor is aligned with a respective one of the piezo actuators.

\* \* \* \* \*